United States Patent
Wong et al.

(10) Patent No.: US 7,253,848 B2
(45) Date of Patent: *Aug. 7, 2007

(54) ORGANIC THIN FILM TRANSISTOR ARRAY SUBSTRATE AND LIQUID CRYSTAL DISPLAY INCLUDING THE SAME

(75) Inventors: Yih-Jun Wong, Tainan (TW); Horng-Long Cheng, Hsinchu (TW); Yu-Wu Wang, Taichung (TW)

(73) Assignee: Industrial Technology Research Institute, Hsinchu (TW)

(*) Notice: Subject to any disclaimer, the term of this patent is extended or adjusted under 35 U.S.C. 154(b) by 0 days.

This patent is subject to a terminal disclaimer.

(21) Appl. No.: 10/458,335

(22) Filed: Jun. 10, 2003

(65) Prior Publication Data

US 2004/0150761 A1  Aug. 5, 2004

(30) Foreign Application Priority Data

Jan. 30, 2003  (TW) ............................... 92102173 A (51) Int. Cl.
  *G02F 1/136* (2006.01)
(52) U.S. Cl. .................... 349/43; 349/42; 257/59; 257/72
(58) Field of Classification Search ................ 349/113, 349/42–43; 257/59, 72
  See application file for complete search history.

(56) References Cited

U.S. PATENT DOCUMENTS

| | | | |
|---|---|---|---|
| 5,355,235 A | | 10/1994 | Nishizawa et al. |
| 5,805,252 A | * | 9/1998 | Shimada et al. ............. 349/113 |
| 5,854,663 A | * | 12/1998 | Oh et al. ...................... 349/42 |
| 6,060,333 A | | 5/2000 | Tanaka et al. |
| 6,300,988 B1 | | 10/2001 | Ishihara et al. |
| 6,326,640 B1 | | 12/2001 | Shi et al. ....................... 257/40 |
| 6,747,718 B2 | | 6/2004 | Kanou et al. ............... 349/113 |
| 6,872,980 B2 | * | 3/2005 | Cheng et al. ................. 257/72 |
| 7,026,644 B2 | * | 4/2006 | Cheng et al. ................. 257/40 |
| 2003/0133059 A1 | | 7/2003 | Wei et al. .................... 349/114 |

* cited by examiner

*Primary Examiner*—Dung T. Nguyen
(74) *Attorney, Agent, or Firm*—Quintero Law Office (57) ABSTRACT

An organic thin film transistor array substrate including a substrate divided into an LCD region and an OTFT region; a first dielectric layer formed on the substrate in the LCD region and having a first uneven portion; an organic semiconducting layer formed on the substrate in the OTFT region; a gate, source, and drain formed in the OTFT region, wherein the source and drain are in contact with the organic semiconducting layer to form a channel between the source and drain; and a pixel electrode formed on the first uneven portion of the first dielectric layer in the LCD region.

21 Claims, 5 Drawing Sheets

ORGANIC THIN FILM TRANSISTOR ARRAY SUBSTRATE AND LIQUID CRYSTAL DISPLAY INCLUDING THE SAME

BACKGROUND OF THE INVENTION

1. Field of the Invention

The present invention relates to an organic thin film transistor array substrate, and more particularly to an organic thin film transistor array substrate in which the dielectric layer underlying the pixel electrode has an uneven structure.

2. Description of the Prior Art

In recent years, organic semiconducting material has drawn many researchers' attention and has proven to be one of the most popular candidates in fabrication of thin film transistors (TFTs) and various electronic and optoelectronic devices. Organic semiconducting material is easy to fabricate, increasing the chance of its future application in flexible displays.

An organic thin film transistor (OTFT) is a TFT that uses an organic layer to serve as the active layer and has been used to drive liquid crystal displays (LCDs). In recent years, in order to simplify the process and decrease production cost, some researchers have developed integration technology that fabricates the LCD and OTFT monolithically (i.e., on the same substrate).

For example, Kabushiki Kaisha Toshiba in U.S. Pat. No. 5,355,235 discloses an integrated device of LCD and bottom-gate OTFT, in which two organic layers are used in the OTFT structure.

Mitshubishi Denki Kabushiki Kaisha in U.S. Pat. No. 6,060,333 discloses a bottom-gate OTFT structure combined with a transmissive or reflective type LCD. For the reflective LCD, the reflector sheet is simply a mirror surface; therefore, the display effect (reflectivity and contrast) is inferior.

Hitachi, Ltd. in U.S. Pat. No. 6,300,988 B1 uses a bottom-gate OTFT combined with an LCD. A patterned insulating layer is used to make the overlying deposited organic semiconducting layer have a pattern, thus separating into a channel region and a non-channel region. Thus, current leakage and crosstalk between devices decreases.

For the above-mentioned reflective or transflective LCD driven by OTFT, the display effect requires improvement.

SUMMARY OF THE INVENTION

An object of the present invention is to solve the above-mentioned problems and provide an organic thin film transistor (OTFT) array substrate and a liquid crystal display (LCD) including the OTFT array substrate, in which the LCD exhibits good display effect.

To achieve the above object, the OTFT array substrate of the present invention includes:

a substrate divided into a liquid crystal display (LCD) region and an organic thin film transistor (OTFT) region;

a first dielectric layer formed on the substrate in the LCD region and having a first uneven portion;

an organic semiconducting layer formed on the substrate in the OTFT region;

a gate, source, and drain formed in the OTFT region, wherein the source and drain are in contact with the organic semiconducting layer to form a channel between the source and drain; and a pixel electrode formed on the first uneven portion of the first dielectric layer in the LCD region.

According to the present invention, the process for fabricating the organic thin film transistor array substrate includes the following steps. A substrate divided into an LCD region and an OTFT region is provided. A first dielectric layer having a first uneven portion is formed on the substrate in the LCD region. An organic semiconducting layer is formed on the substrate in the OTFT region. A gate, a source, and a drain are formed in the OTFT region, such that the source and the drain are in contact with the organic semiconducting layer to form a channel between the source and the drain. A pixel electrode is formed on the first uneven portion of the first dielectric layer in the LCD region.

When the OTFT is a bottom-gate type, the process for fabricating the OTFT array substrate includes the following steps. A substrate divided into an LCD region and an OTFT region is provided. A gate is formed on the substrate in the OTFT region, and a dielectric layer is formed in the LCD and OTFT regions to cover the gate. The dielectric layer is patterned to concurrently form a first dielectric layer having a first uneven portion in the LCD region and a second dielectric layer in the OTFT region. An organic semiconducting layer is formed on the second dielectric layer in the OTFT region. A conductive layer is formed in the LCD and OTFT regions, and the conductive layer is patterned to concurrently form a pixel electrode on the first uneven portion of the first dielectric layer in the LCD region and a source and drain in the OTFT region, such that the source and drain are in contact with the organic semiconducting layer to form a channel between the source and drain.

When the OTFT is a top-gate type, the process for fabricating the OTFT array substrate includes the following steps. A substrate divided into an LCD region and an OTFT region is provided. An organic semiconducting layer is formed on the substrate in the OTFT region. A source and drain are formed on the organic semiconducting layer in the OTFT region to form a channel between the source and drain. A dielectric layer is formed on the substrate to cover the source and drain. The dielectric layer is patterned to form a first dielectric layer having a first uneven portion in the LCD region and to form a second dielectric layer on the source and drain in the OTFT region. A metal layer is formed on the first and second dielectric layer, and the metal layer is patterned to form a pixel electrode on the first dielectric layer in the LCD region and to form a gate on the second dielectric layer in the OTFT region.

The present invention also provides a liquid crystal display including an OTFT array substrate. The liquid crystal display includes an OTFT array substrate, a color filter substrate, and liquid crystal interposed between the OTFT array substrate and the color filter substrate. The OTFT array substrate includes:

a substrate divided into an LCD region and an OTFT region;

a first dielectric layer formed on the substrate in the LCD region and having a first uneven portion;

an organic semiconducting layer formed on the substrate in the OTFT region;

a gate, source, and drain formed in the OTFT region, wherein the source and drain are in contact with the organic semiconducting layer to form a channel between the source and drain; and a pixel electrode formed on the first uneven portion of the first dielectric layer in the LCD region.

DETAILED DESCRIPTION OF THE INVENTION

FIGS. 1a to 1e are cross-sections illustrating the process flow of the liquid crystal display including the bottom-gate organic thin film transistor array substrate according to a first preferred embodiment of the present invention.

Figure 1A:
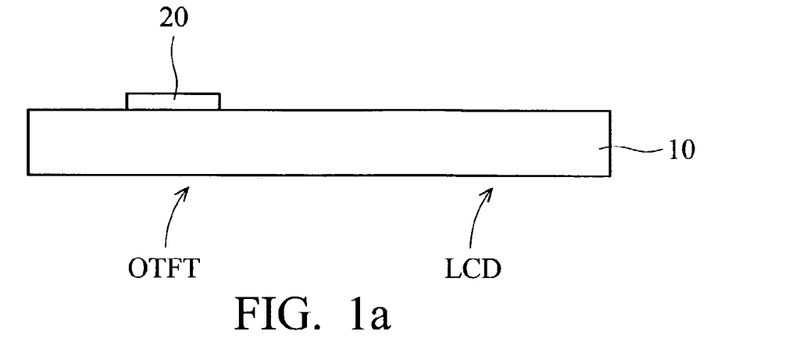
FIGS. 1a to 1e are cross-sections illustrating the process flow of the liquid crystal display including the bottom-gate organic thin film transistor array substrate according to a first preferred embodiment of the present invention.

Referring to FIG. 1a, a substrate 10 divided into a liquid crystal display (LCD) region and an organic thin film transistor (OTFT) region is provided. A gate 20 is formed on the substrate 10 in the OTFT region.

Figure 1B:
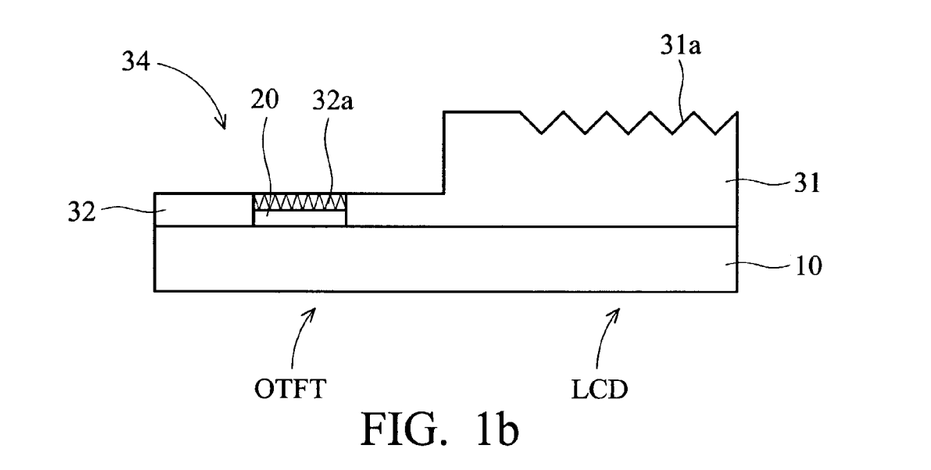

Subsequently, referring to FIG. 1b, a dielectric layer (not shown) is formed in the LCD and OTFT regions to cover the gate 20. The dielectric layer can be a material that can be patterned. Next, the dielectric layer is patterned to concurrently form a first dielectric layer 31 in the LCD region and a second dielectric layer 32 in the OTFT region. The second dielectric layer 32 is lower than the first dielectric layer 31, thus forming a bank 34. Moreover, the first dielectric layer 31 in the LCD region has a first uneven portion 31a, and the second dielectric layer 32 in the OTFT region has a second uneven portion 32a with an alignment property. The bank 34 formed in the OTFT region is used to prevent crosstalk and current leakage.

According to the present invention, the method of patterning the dielectric layer is not limited. For example, the dielectric layer can be irradiated by an ion beam through a mask and then developed. Or, if the dielectric that can be patterned is a photoresist, the dielectric layer can be exposed to light through a mask and then be developed. The dielectric layer can be patterned using one mask in one course. For example, by means of a one time light exposure through a gray-tone mask, the first uneven portion 31a in the LCD region, the bank 34 in the OTFT region and the second uneven portion 32a in the bank can be concurrently formed.

Alternatively, the dielectric layer can be patterned using two masks in two courses. For example, the OTFT region is first masked and the dielectric layer in the LCD region is pattered, thus forming the first dielectric layer 31 having the first uneven portion 31a in the LCD region. Then, the LCD region is masked and the dielectric layer in the OTFT region is patterned, thus, in the OTFT region, forming the bank 34 and the second dielectric layer 32 having the second uneven portion 32a.

Alternatively, the dielectric layers 31 and 32 can be different materials. For example, two dielectric layers with two different materials are formed in the LCD and OTFT regions respectively. Then, light exposure is performed twice by two masks. Thus, the dielectric layer 31 having the first uneven portion 31a in the LCD region and the dielectric layer 32 having the second uneven portion 32a in the OTFT region are formed respectively.

The first and second uneven portions 31a and 32a can have the same alignment direction. Or, the first and second uneven portions 31a and 32a can have different alignment directions in order to meet different requirements in the LCD and OTFT regions, and achieve the best result.

Figure 1C:
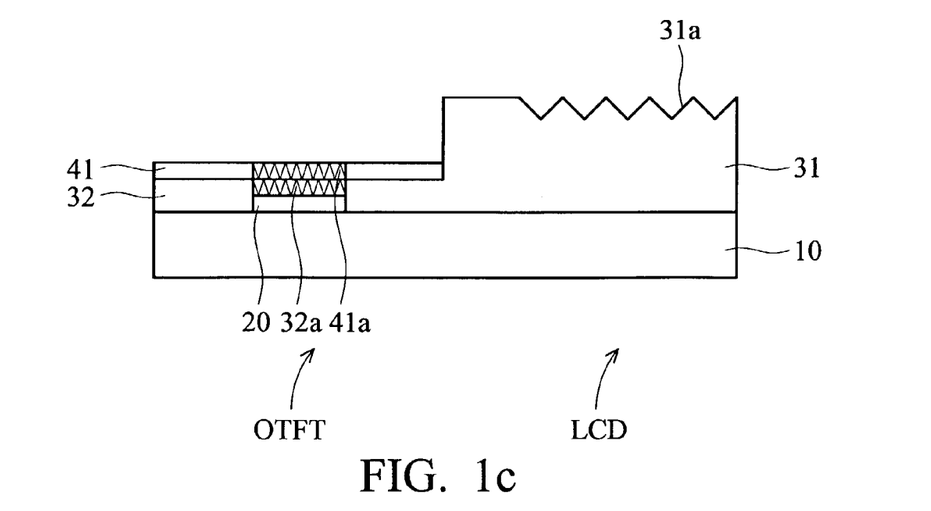
Figure 1D:
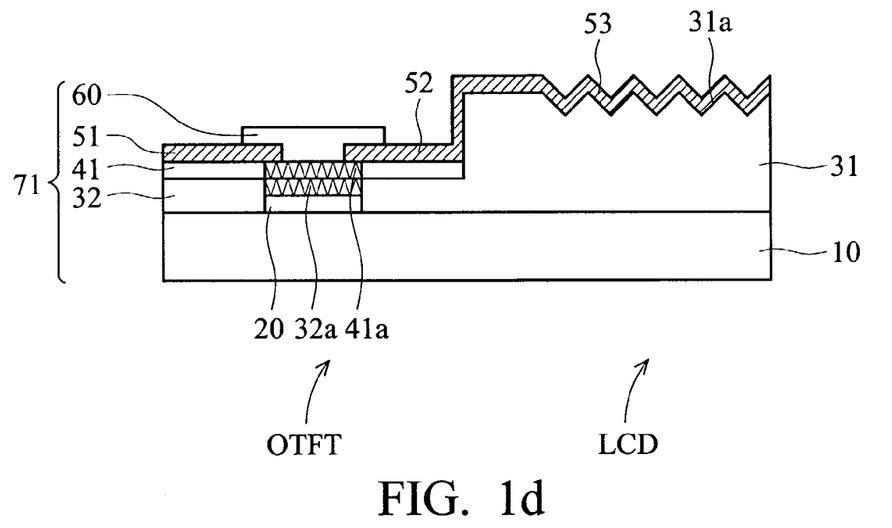

In a future step, a pixel electrode 53 will be formed on the first uneven portion 31a of the first dielectric layer 31 in the LCD region (FIG. 1d). Therefore, in order to make the pixel electrode have better reflectivity, the first dielectric layer 31 can be sloped; for example, it can be a diffusive microslant reflector (DMSR). Alternatively, the first dielectric layer 31 can be fan-shaped to increase reflectivity. In addition, the second uneven portion 32a can have a microgroove form.

Subsequently, referring to FIG. 1c, an organic semiconducting layer 41 is formed on the second dielectric layer 32 in the OTFT region. The organic semiconducting layer 41 will align according to the alignment direction of the second uneven portion 32a. Thus, an aligned organic semiconducting portion 41a is formed on the second uneven portion 32a in a corresponding portion. Since the organic semiconducting portion 41a is aligned, carrier mobility increases.

Subsequently, referring to FIG. 1d, a source 51 and drain 52 are formed in the OTFT region, and a pixel electrode 53 is formed in the LCD region. The source 51, drain 52, and pixel electrode 53 can be the same material and formed in the same course. For example, a conductive layer (not shown) is formed in the LCD and OTFT regions. The conductive layer is preferably a high reflectivity material having a reflectivity higher than 60%, most preferably in the range of 60% to 95%, for example, a metal material such as aluminum. Next, the conductive layer is patterned to form the source 51, drain 52 and pixel electrode 53. The pixel electrode 53 is located on the first uneven portion 31a and will deposit according to the shape of the first uneven portion 31a. Thus, the pixel electrode 53 will be aligned, increasing the reflectivity.

In order for the OTFT to achieve better carrier mobility, the source 51 and drain 52 are preferably in contact with the organic semiconducting portion 41a, such that the channel direction between the source 51 and drain 52 is the same as the alignment direction of the aligned organic semiconducting portion 41a. That is, the channel direction is the same as the alignment direction of the second uneven portion 32a of the dielectric layer 32.

Subsequently, still referring to FIG. 1d, a passivation layer 60 is formed on the organic semiconducting layer 41 in the OTFT region. Thus far, an organic thin film transistor array substrate 71 is accomplished. The OTFT array substrate 71 can be used to fabricate a reflective liquid crystal display or a transflective liquid crystal display. For a transflective LCD, the aligned pixel electrode 53 in the OTFT array substrate functions as a reflective portion, and the transmissive portion requires a transparent electrode (not shown) such as ITO (indium tin oxide).

Subsequently, referring to FIG. 1e, a color filter substrate 78 is provided, and liquid crystal 80 is formed between the OTFT array substrate 71 and the color filter substrate 78 to complete the LCD fabrication.

Figure 2:
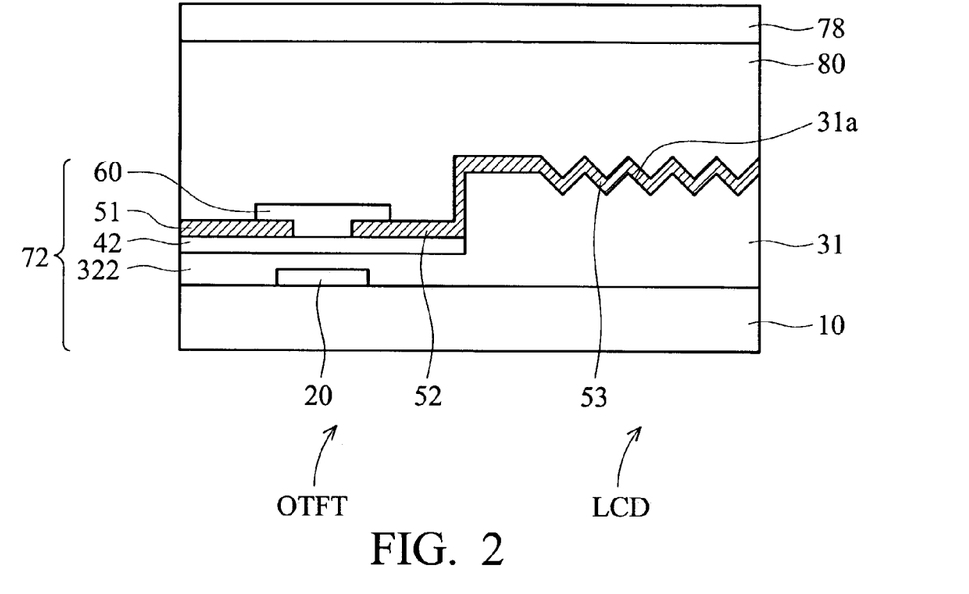
FIG. 2 is a cross-section of the liquid crystal display including the bottom-gate organic thin film transistor array substrate according to a second preferred embodiment of the present invention.

FIG. 2 is a cross-section of the liquid crystal display including a bottom-gate OTFT array substrate according to a second preferred embodiment of the present invention. The liquid crystal display includes an OTFT array substrate 72, a color filter substrate 78, and liquid crystal 80 interposed between the OTFT array substrate 72 and the color filter substrate 78.

The OTFT array substrate 72 of FIG. 2 includes a substrate 10 divided into an LCD region and an OTFT region; a gate 20 formed on the substrate 10 in the OTFT region; a first dielectric layer 31 formed on the substrate 10 in the LCD region and having a first uneven portion 31a; a second dielectric layer 322 formed on the gate 20 in the OTFT region; an organic semiconducting layer 42 formed on the second dielectric layer 322 in the OTFT region; a source 51 and drain 52 both formed on the organic semiconducting layer 42; a pixel electrode 53 formed on the first uneven portion 31a of the first dielectric layer 31 in the LCD region; and a passivation layer 60 formed on the organic semiconducting layer 42.

Figure 1E:
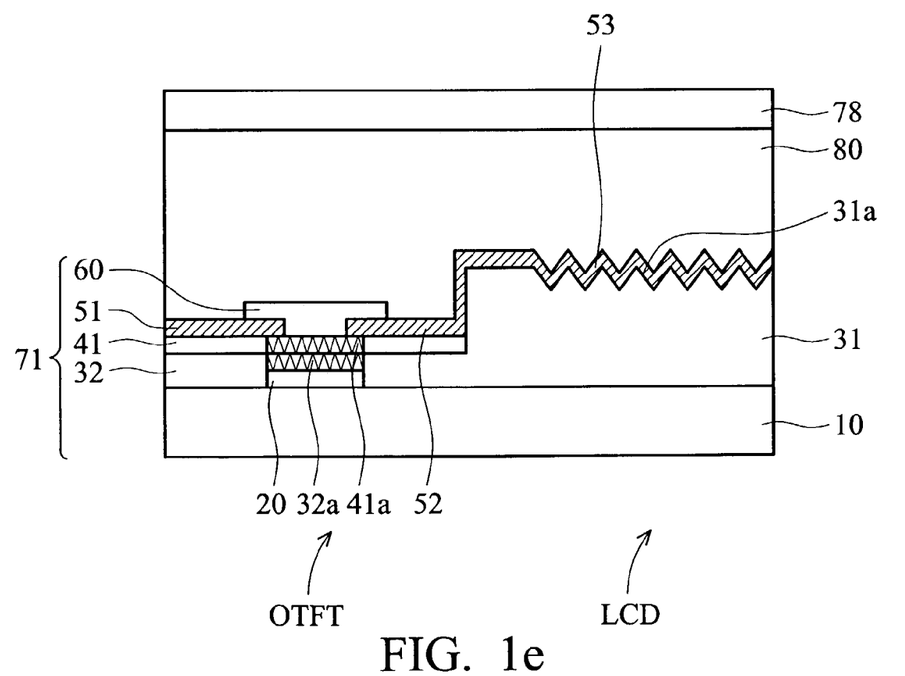

The LCDs of FIG. 2 and FIG. 1e have similar structures. The difference resides in that the second dielectric layer 322 in FIG. 2 does not have the second uneven portion. Therefore, the organic semiconducting layer 42 overlying the second dielectric layer has no molecular alignment.

The process for fabricating the LCD of FIG. 2 is almost the same as FIG. 1e; therefore, detailed cross-sections illustrating the process flow are omitted. First, a substrate 10 divided into an LCD region and an OTFT region is provided. A gate 20 is formed on the substrate 10 in the OTFT region. Next, a dielectric layer (not shown) is formed in the LCD and OTFT regions to cover the gate 20. Next, the dielectric layer is patterned to concurrently form a first dielectric layer 31 having a first uneven portion 31a in the LCD region and a second dielectric layer 322 in the OTFT region. Next, an organic semiconducting layer 42 is formed on the second dielectric layer 322 in the OTFT region. Next, a conductive layer (not shown) is formed in the LCD and OTFT regions and is then patterned to concurrently form a pixel electrode 53 on the first uneven portion 31a of the first dielectric layer 31 in the LCD region, and a source and drain in the OTFT region. Next, a passivation layer is formed on the organic semiconducting layer 42 to complete the OTFT array substrate 72. Finally, liquid crystal 80 is formed between the OTFT array substrate 72 and a color filter substrate 78.

Figure 3:
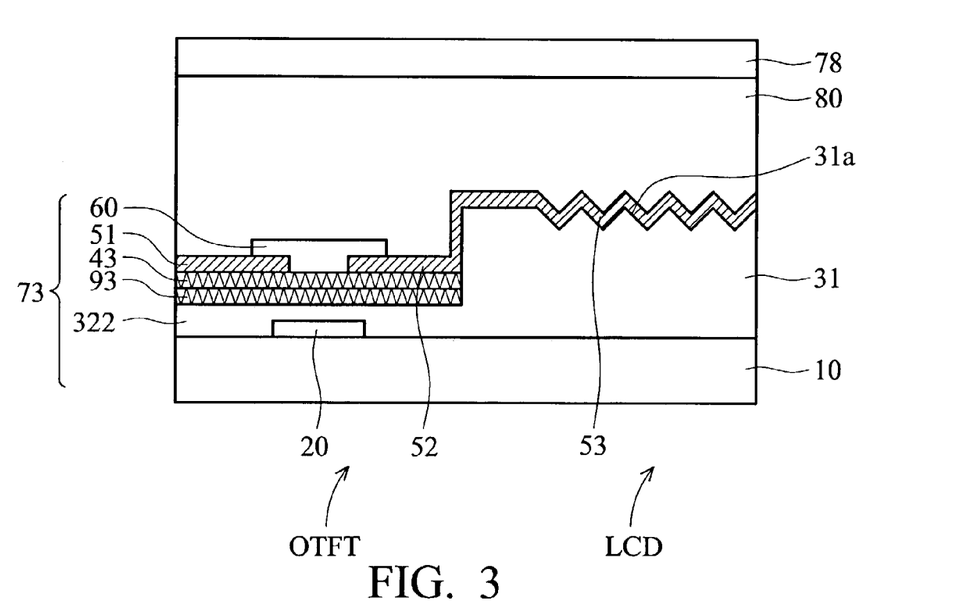
FIG. 3 is a cross-section of the liquid crystal display including the bottom-gate organic thin film transistor array substrate according to a third preferred embodiment of the present invention.

FIG. 3 is a cross-section of the liquid crystal display including a bottom-gate OTFT array substrate according to a third preferred embodiment of the present invention. The structure and process of FIG. 3 are similar to FIG. 2; therefore, detailed cross-sections illustrating the process flow are omitted. FIG. 3 differs from FIG. 2 in that after patterning the dielectric layer and before forming the organic semiconducting layer 43, an alignment film 93 is formed on the second dielectric layer 322 in the OTFT region. Then, the organic semiconducting layer 43 is formed on the alignment film 93. Thus, the organic semiconducting layer 43 will align according to the alignment direction of the alignment film 93.

Figure 4:
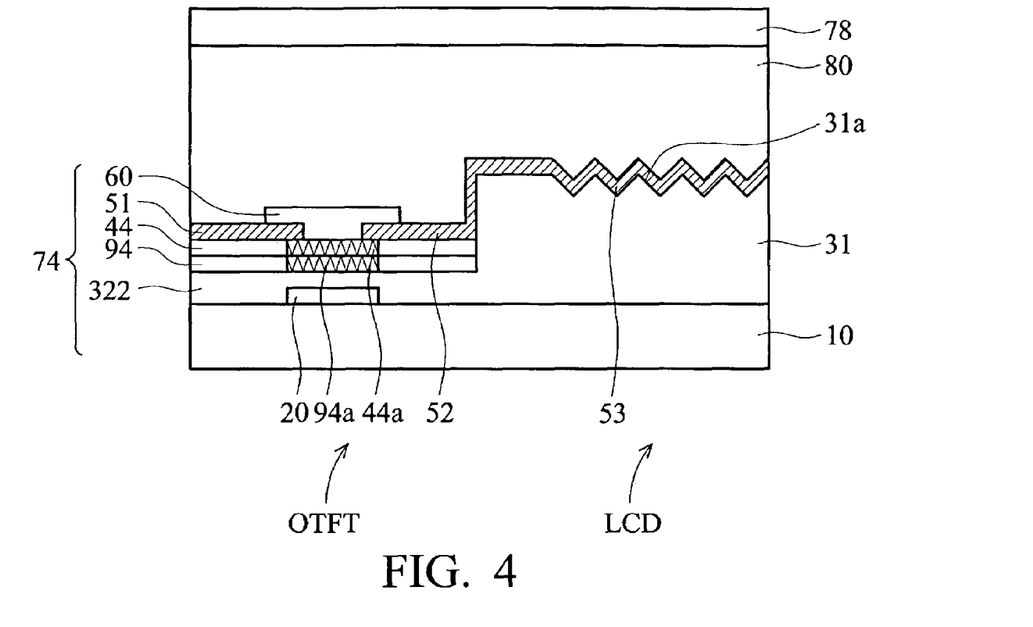
FIG. 4 is a cross-section of the liquid crystal display including the bottom-gate organic thin film transistor array substrate according to a fourth preferred embodiment of the present invention.

Formation of the alignment film is not limited. For example, a film such as a PI (polyimide) film is first formed and then rubbing is performed to form the alignment film 93 with alignment over the entire surface, as shown in FIG. 3. Or, alternatively, the alignment film can be made to have different alignment directions in different regions. For example, refer to FIG. 4, showing a cross-section of the liquid crystal display including a bottom-gate OTFT array substrate according to a fourth preferred embodiment of the present invention. Symbol 94 refers to an alignment film, symbol 44 an organic semiconducting layer, symbol 74 an OTFT array substrate, and other symbols the same as FIG. 3 refer to the same elements. As can be seen from FIG. 4, only the portion of the film 94 labeled as 94a is aligned. Thus, the organic semiconducting layer 44 can be controlled to have partial alignment. As shown in FIG. 4, only the portion labeled as 44a is aligned.

The process for forming the alignment film 94 with partial alignment in FIG. 4 is described below. A third dielectric layer (not shown) is formed and then irradiated by an ion beam through a mask. Next, developing is performed to obtain the alignment film 94 with partial alignment. Alternatively, a photoresist layer (not shown) is formed and then exposed to light through a mask, and developing is then performed to obtain the alignment film 94 with partial alignment. Alternatively, a photoalignment organic layer (not shown) is formed and then irradiated by a polarized light through a mask. Thus, the organic layer becomes the alignment film 94 with partial alignment.

Figure 5:
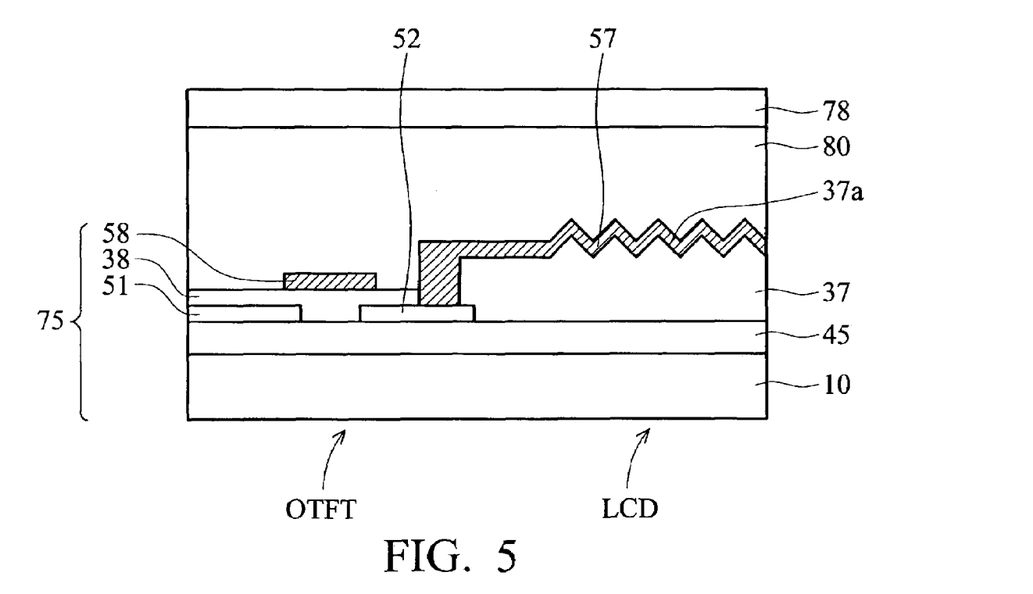
FIG. 5 is a cross-section of the liquid crystal display including the top-gate organic thin film transistor array substrate according to a fifth preferred embodiment of the present invention.

FIG. 5 is a cross-section of the liquid crystal display including a top-gate OTFT array substrate according to a fifth preferred embodiment of the present invention. The liquid crystal display includes an OTFT array substrate 75, a color filter substrate 78, and liquid crystal 80 formed between the OTFT array substrate 75 and the color filter substrate 78.

The OTFT array substrate 75 of FIG. 5 includes a substrate 10 divided into an LCD region and an OTFT region; an organic semiconducting layer 45 formed on the substrate 10; a source 51 and drain 52 formed on the organic semiconducting layer 45 in the OTFT region; a first dielectric layer 37, having a first uneven portion 37a, formed in the LCD region; a second dielectric layer 38 formed on the source 51 and drain 52 in the OTFT region; a pixel electrode 57 formed on the first uneven portion 37a of the first dielectric layer 37 in the LCD region; and a gate 58 formed on the second dielectric layer 38 in the OTFT region.

Fabrication of the LCD of FIG. 5 is almost the same as mentioned above and is described in the following. First, a substrate 10 divided into an LCD region and an OTFT region is provided. An organic semiconducting layer 45 is formed on the substrate 10 in the OTFT region. Next, a source 51 and drain 52 are formed on the organic semiconducting layer 45 in the OTFT region and a channel is formed between the source and drain. A dielectric layer (not shown) is formed on the substrate 10 to cover the source 51 and drain 52. Next, the dielectric layer is patterned to form a first dielectric layer 37 having a first uneven portion 37a in the LCD region, and a second dielectric layer 38 on the source 51 and drain 52 in the OTFT region. Next, a metal layer (not shown) is formed on the first and second dielectric layers 37 and 38. The metal layer is patterned to form a pixel electrode 57 on the first dielectric layer 37 in the LCD region, and a gate 58 on the second dielectric layer 38 in the OTFT region. Thus far, an OTFT array substrate 75 is accomplished.

Finally, liquid crystal 80 is formed between the OTFT array substrate 75 and a color filter substrate 78 to complete the LCD.

Figure 6:
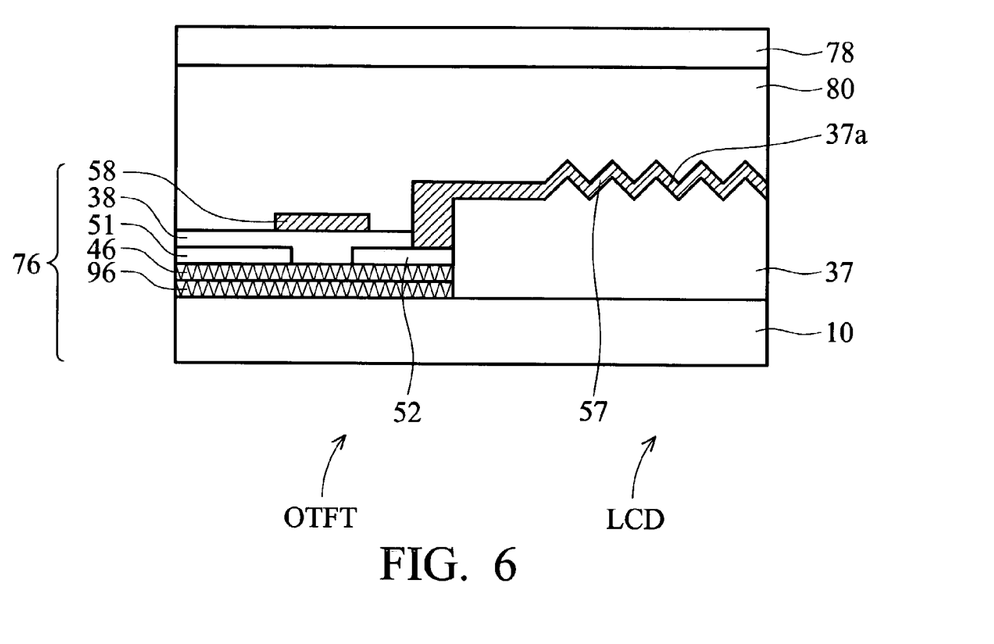
FIG. 6 is a cross-section of the liquid crystal display including the top-gate organic thin film transistor array substrate according to a sixth preferred embodiment of the present invention.

FIG. 6 is a cross-section of the liquid crystal display including a top-gate OTFT array substrate according to a sixth preferred embodiment of the present invention. The structure and process of FIG. 6 are similar to FIG. 5; therefore, detailed description is omitted. In FIG. 6, symbol 96 refers to an alignment film, symbol 46 an organic semiconducting layer, symbol 76 an OTFT array substrate, and other symbols the same as FIG. 5 refer to the same elements. FIG. 6 differs from FIG. 5 mainly in that the alignment film 96 is formed on the substrate 10 in the OTFT region before formation of the organic semiconducting layer 46. Thus, the organic semiconducting layer 46 will align according to the alignment direction of the alignment film 96. Formation of the alignment film 96 is similar to the above description and is omitted here. The alignment film 96 is aligned over the entire surface.

Figure 7:
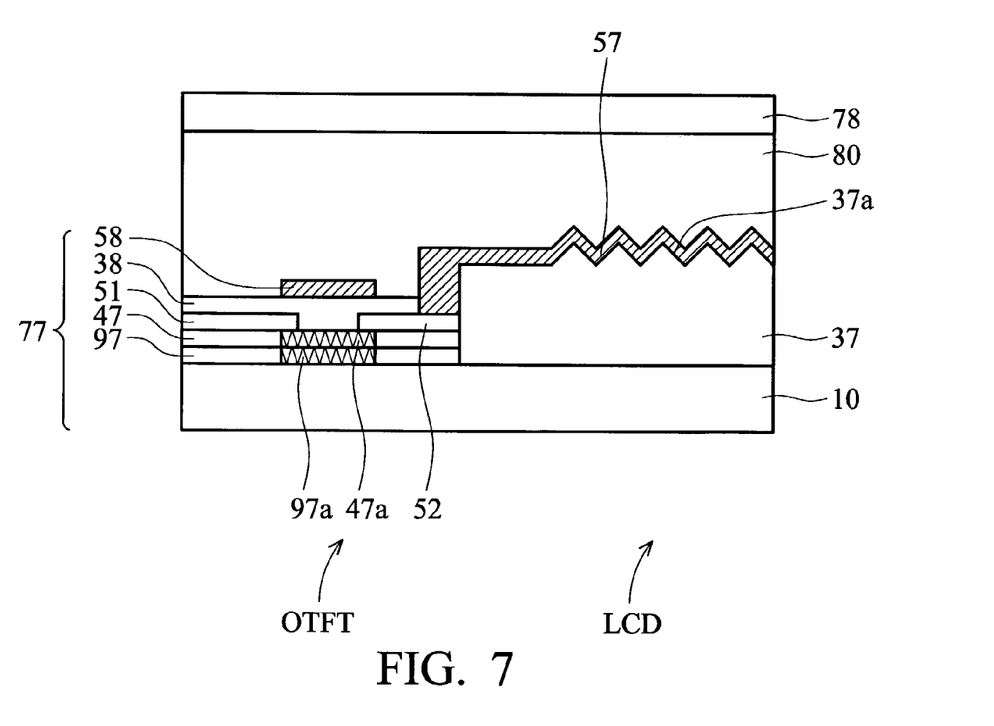
FIG. 7 is a cross-section of the liquid crystal display including the top-gate organic thin film transistor array substrate according to a seventh preferred embodiment of the present invention.

FIG. 7 is a cross-section of the liquid crystal display including a top-gate OTFT array substrate according to a seventh preferred embodiment of the present invention. The structure and process of FIG. 7 are similar to FIG. 6; therefore, detailed description is omitted. In FIG. 7, symbol 97 refers to an alignment film, symbol 47 an organic semiconducting layer, symbol 77 an OTFT array substrate, and other symbols the same as FIG. 5 refer to the same elements. FIG. 7 differs from FIG. 6 mainly in that only the portion of the alignment film 97 labeled as 97*a* is aligned. Thus, the organic semiconducting layer 47 can be controlled to have partial alignment. That is, only the portion labeled as 47*a* has alignment. The process for forming the alignment film with partial alignment is the same as described above and detailed description is omitted.

In conclusion, the present invention forms the first dielectric layer having the first uneven portion in the LCD region; thus, the overlying pixel electrode has better reflectivity and display effect. Moreover, when the first dielectric layer in the LCD region is formed, the second dielectric layer having the second uneven portion with alignment can be formed in the OTFT region. Thus, the overlying semiconducting layer can align according to the alignment direction of the second uneven portion, thus increasing the carrier mobility efficiency and improving electric properties.

The foregoing description of the preferred embodiments of this invention has been presented for purposes of illustration and description. Obvious modifications or variations are possible in light of the above teaching. The embodiments chosen and described provide an excellent illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. An organic thin film transistor array substrate comprising:
    a substrate divided into a liquid crystal display (LCD) region and an organic thin film transistor (OTFT) region;
    a first dielectric layer formed on the substrate in the LCD region and having a first uneven portion;
    a second dielectric layer and an organic semiconducting layer formed on the substrate in the OTFT region;
    a gate, source, and drain formed in the OTFT region, wherein the source and drain are in contact with the organic semiconducting layer to form a channel between the source and drain;
    an alignment film between the second dielectric layer and the organic semiconducting layer, such that the organic semiconducting layer aligns according to the alignment of the alignment film, wherein the organic semiconducting layer is formed directly above and in physical contact with the alignment film; and
    a pixel electrode formed on the first uneven portion of the first dielectric layer in the LCD region.

2. The organic thin film transistor array substrate as claimed in claim 1, wherein the second dielectric layer has a second uneven portion, and the second uneven portion has an alignment property, such that the organic semiconducting layer aligns according to the alignment of the second uneven portion.

3. The organic thin film transistor array substrate as claimed in claim 2, wherein the first and second dielectric layer are composed of the same material.

4. The organic thin film transistor array substrate as claimed in claim 2, wherein the channel between the source and drain has a channel direction the same as the alignment direction of the second uneven portion of the second dielectric layer.

5. The organic thin film transistor array substrate as claimed in claim 1, wherein the pixel electrode and any one, or a combination of the gates, source or drain are composed of the same material.

6. The organic thin film transistor array substrate as claimed in claim 1, wherein the pixel electrode is highly reflective material having a reflectivity higher than 60%.

7. The organic thin film transistor array substrate as claimed in claim 6, wherein the pixel electrode is metal.

8. The organic thin film transistor array substrate as claimed in claim 1, wherein the second dielectric layer in the OTFT region is located lower than the first dielectric layer in the LCD region to form a bank.

9. The organic thin film transistor array substrate as claimed in claim 1, wherein the organic thin film transistor is bottom-gate type and wherein:
    the gate is formed on the substrate in the OTFT region; and
    the second dielectric layer is formed on the gate in the OTFT region.

10. The organic thin film transistor array substrate as claimed in claim 1, wherein the alignment film has an alignment portion, such that the organic semiconducting layer aligns according to the alignment of the alignment portion of the alignment film.

11. The organic thin film transistor array substrate as claimed in claim 1, wherein a channel direction between the source and drain is the same as the alignment direction of the aligned organic semiconducting layer.

12. A liquid crystal display including an organic thin film transistor array substrate, comprising an organic thin film transistor array substrate, a color filter substrate, and liquid crystal interposed between the organic thin film transistor array substrate and the color filter substrate, wherein the organic thin film transistor array substrate comprises:
    a substrate divided into an LCD region and an OTFT region;
    a first dielectric layer formed on the substrate in the LCD region and having a first uneven portion;
    a second dielectric layer and an organic semiconducting layer formed on the substrate in the OTFT region;

a gate, source, and drain formed in the QTFT region, wherein the source and drain are in contact with the organic semiconducting layer to form a channel between the source and drain;

an alignment film between the second dielectric layer and the organic semiconducting layer, such that the organic semiconducting layer aligns according to the alignment of the alignment film, wherein the organic semicoducting layer is formed directly above and in physical contact with the alignment film; and a pixel electrode formed on the first uneven portion of the first dielectric layer in the LCD region.

13. The liquid crystal display as claimed in claim 12, wherein the second dielectric layer has a second uneven portion with alignment property, such that the organic semiconducting layer aligns according to the alignment of the second uneven portion.

14. The liquid crystal display as claimed in claim 13, wherein the first and second dielectric layer are made of the same material.

15. The liquid crystal display as claimed in claim 13, wherein the second dielectric layer in the OTFT region is located lower than the first dielectric layer in the LCD region to form a bank.

16. The liquid crystal display as claimed in claim 13, wherein the channel between the source and drain has a channel direction the same as the alignment direction of the second uneven portion of the second dielectric layer.

17. The liquid crystal display as claimed in claim 12, wherein the pixel electrode and any one, or a combination of the gate, source or drain are made of the same material.

18. The liquid crystal display as claimed in claim 12, wherein the pixel electrode is highly reflective material having a reflectivity of higher than 60%.

19. The liquid crystal display as claimed in claim 18, wherein the pixel electrode is metal.

20. The liquid crystal display as claimed in claim 12, wherein a channel direction between the source and drain is the same as the alignment direction of the aligned organic semiconducting layer.

21. An organic thin film transistor array substrate, comprising:

a substrate divided into an LCD region and an OTFT region;

a first dielectric layer formed in the LCD region and having a first uneven portion;

a gate formed in the OTFT region;

a second dielectric layer formed in the OTFT region to cover the gate;

an alignment film formed on the second dielectric layer;

an organic semiconducting layer formed directly on and in physical contact with the alignment film, such that the organic semiconducting layer aligns according to the alignment of the alignment film;

a source and a drain both formed on the semiconducting layer, wherein the source and drain are in contact with the organic semiconducting layer to form a channel between the source and drain; and a pixel electrode formed on the first uneven portion of the first dielectric layer in the LCD region.

* * * * *